United States Patent [19]

Takezawa et al.

[11] Patent Number: 5,642,228
[45] Date of Patent: Jun. 24, 1997

[54] RESIN-MOLDED LENS HAVING NO SINK MARKS AND PROCESS FOR PRODUCING SAME

[75] Inventors: Shiro Takezawa; Hirokazu Yanagihara, both of Shizuoka, Japan

[73] Assignee: Koito Manufacturing Co., Ltd., Tokyo, Japan

[21] Appl. No.: 360,961

[22] Filed: Dec. 21, 1994

[30] Foreign Application Priority Data

Dec. 21, 1993 [JP] Japan ................... 5-344670

[51] Int. Cl.⁶ ................. G02B 3/00; B29D 11/00
[52] U.S. Cl. ......................... 359/642; 264/1.7
[58] Field of Search .................... 359/642, 646, 359/647; 264/1.7, 2.2, 2.3, 2.4, 2.5

[56] References Cited

U.S. PATENT DOCUMENTS

| | | |
|---|---|---|
| 4,225,848 | 9/1980 | Roberts . |
| 4,566,929 | 1/1986 | Waugh .................... 264/1.7 |
| 4,800,980 | 1/1989 | Hideo et al. . |
| 4,999,142 | 3/1991 | Fukushima et al. ......... 264/1.7 |
| 5,275,764 | 1/1994 | Hettinga ................ 264/1.7 |
| 5,316,702 | 5/1994 | Blum et al. ............. 264/2.3 |
| 5,335,155 | 8/1994 | Hanson et al. . |

FOREIGN PATENT DOCUMENTS

| | | |
|---|---|---|
| 4417404 | 11/1994 | Germany . |
| 63-159032 | 7/1988 | Japan . |
| 01210334 | 8/1989 | Japan . |
| 405337983A | 12/1993 | Japan . |
| 0582248 | 11/1946 | United Kingdom . |

*Primary Examiner*—Scott J. Sugarman
*Attorney, Agent, or Firm*—Sughrue, Mion, Zinn, Macpeak & Seas

[57] ABSTRACT

A resin-molded automotive lens, and a method for producing same, in which sink marks are prevented from being formed in a thin lens surface portion of the lens. In a resin-molded lens having a thin lens surface portion and a thick portion such as a seal leg portion or boss portions formed integrally with at least a part of this lens surface portion, the lens surface portion and the thick portion are formed in separate injections. That is, the thick portion is molded with resin integrally with another lens surface portion in advance, and thereafter the thin lens surface portion is molded with resin integrally with this thick portion, so that in this portion it is possible to reduce the influence of cooling of the resin when the lens surface portion is molded to thereby prevent sink marks from being formed in the lens surface portion.

10 Claims, 4 Drawing Sheets

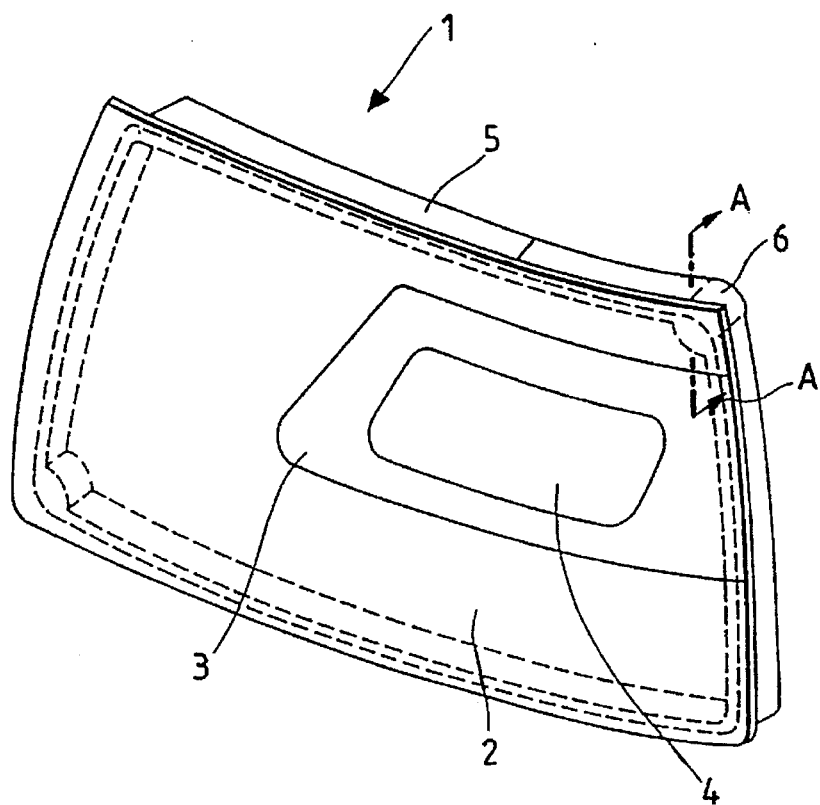
FIG. 1
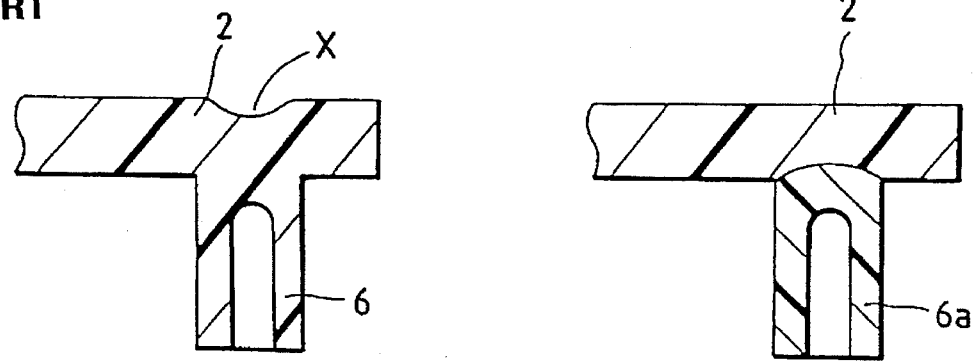
FIG. 5(a) PRIOR ART
FIG. 5(b)

RESIN-MOLDED LENS HAVING NO SINK MARKS AND PROCESS FOR PRODUCING SAME

BACKGROUND OF THE INVENTION

The present invention relates to a resin-molded lens for a lamp, and particularly to a resin-molded lens in which depressions (so-called sink marks) are prevented from being formed in the surface of a lens surface portion.

Recently, lenses for automotive lamps have been formed as resin moldings. For example, as shown in FIG. 1, a lens 1 used for a rear lamp of a car is formed of resin material. In such a lens 1, a lens surface portion for transmitting light from a lamp is generally thin. A seal leg portion 5 is formed on the circumference of the lens surface portion so that the lens can be attached to a lamp body to thereby form a seal therebetween through the seal leg portion 5. Boss portions 6 through which pass screws for fixing the lens to the lamp body are provided in positions of the seal leg portion 5. For this purpose, the boss portions 6 are made generally thick.

A resin-molded lens having such a structure is formed by integral molding of resin. However, sometimes one or more depressions, called sink marks, are generated in the surface of the lens because of shrinkage when the injected resin cools and solidifies. Such sink marks are conspicuous in proportion to the volume of the resin. In a lens as described above, a sink mark is apt to be formed in thick portions having a large volume of resin such as the seal leg portion or the boss portions. In particular, the boss portions are large in volume in comparison with other portions, so that a sink mark X is often formed in the surface of the lens surface portion 2 corresponding to each boss portion 6, as shown in FIG. 5(a), which shows an enlarged sectional structure of the portion taken on line A—A in FIG. 1. Although such a sink mark cause no problem as to the optical function of the lens, it is not desirable in that the external appearance of the lamp is degraded.

SUMMARY OF THE INVENTION

It is an object of the present invention to provide a resin-molded lens in which sink marks are prevented from being formed in lens surface portions having a thick portion. It is a further object of the invention to provide a method for molding such a lens.

In accordance with the above and other objects, the invention provides a resin-molded lens for a lamp comprising a thin lens surface portion and a thick portion formed integrally with at least part of the lens surface portion, the lens surface portion and the thick portion being formed of separate members.

BRIEF DESCRIPTION OF THE DRAWINGS

FIG. 1 is a perspective view of a lens constructed according to a preferred embodiment of the present invention;

FIGS. 5(a) and 5(b) are sectional views illustrating a conventional thick portion in comparison with that in the present invention.

DESCRIPTION OF THE PREFERRED EMBODIMENTS

A thick portion is molded with resin in advance, and thereafter a thin lens surface portion is molded with resin integrally with this thick portion. Accordingly, the influence of cooling of the resin at the time of molding the lens surface portion is reduced, and sink marks are prevented from being formed in the lens surface portion.

Next, the present invention will be described in more detail with reference to the drawings. FIG. 1 is a perspective view of an embodiment of the present invention, showing an example where the present invention is applied to a lens for a rear combination lamp of an automobile having a backup lamp formed integrally. This lens 1 is constituted by a tail lens surface portion 2, which corresponds to a tail and stop lamp and which is molded with red resin, a turn signal lens surface portion 3 which corresponds to a turn signal lamp and which is molded with amber resin, and a backup lamp lens surface portion 4 which corresponds to a backup lamp and which is molded with white (clear) resin.

The tail lamp lens surface portion 2 and the turn signal lens surface portion 3 are formed integrally using so-called two-color molding, and thereafter the backup lamp lens surface portion 4 is integrally joined by bonding, welding, or the like, into an opening provided in the turn signal lens surface portion 3 by bonding or welding.

Figure 2A:
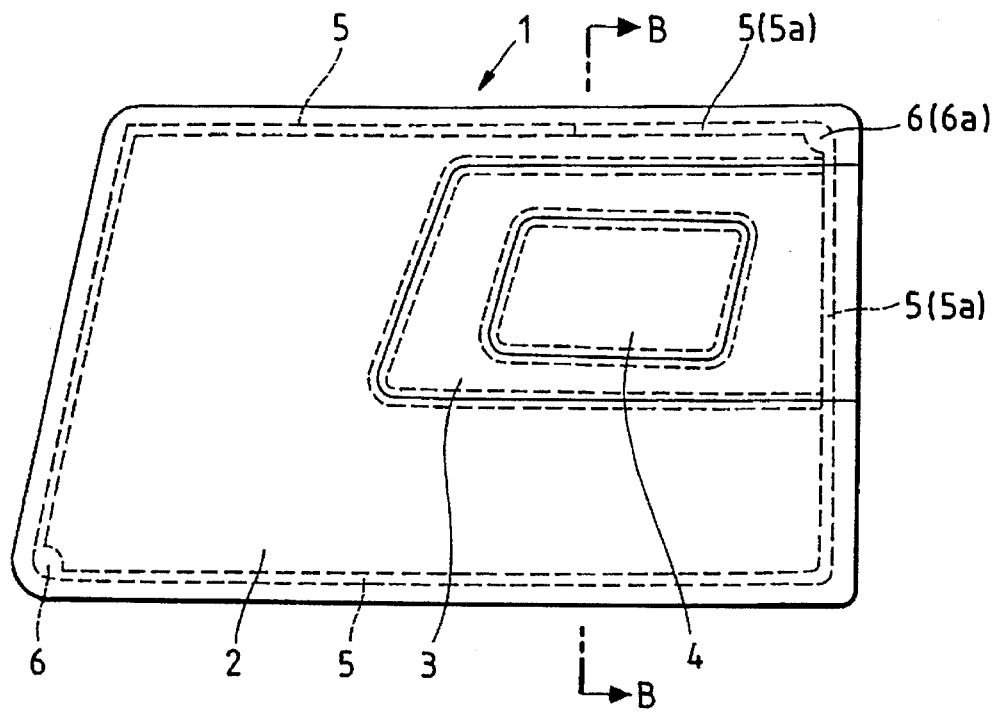
FIG. 2(a) shows a front view of a lamp to which the lens in FIG. 1 is attached, and FIG. 2(b) an enlarged sectional view taken on a line B—B in the front view of FIG. 2(a)
Figure 2B:
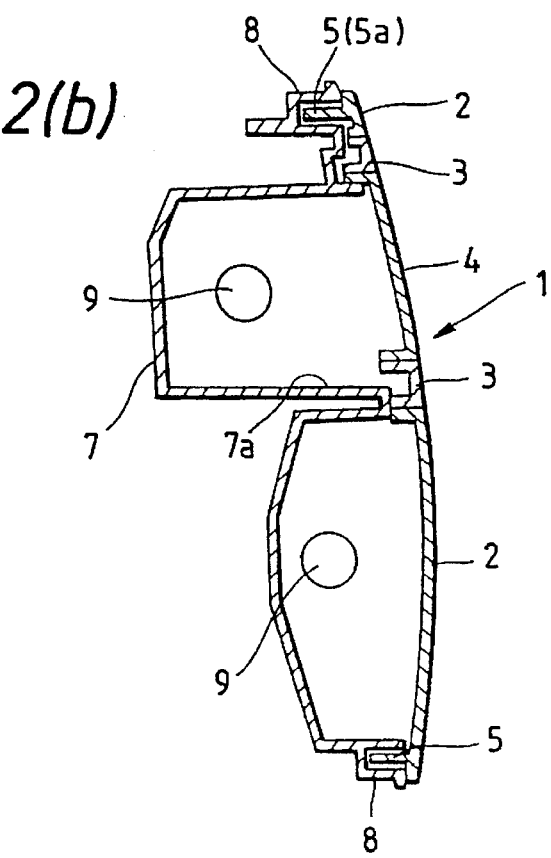

In the tail lamp lens surface portion 2, along the circumferential portion of the rear thereof, a seal leg portion 5 and boss portions 6 are formed integrally to attach the lens 1 to a lamp body (not shown) and to form a seal therebetween. As shown in FIGS. 2(a) and 2(b), which are a front view of the lamp and an enlarged sectional view taken on line B—B in FIG. 2(a), respectively, this lens is attached so as to close the front opening of a lamp body 7. The seal leg portion 5 and the boss portions 6 are inserted into a seal groove 8 provided at the edge of the opening of the lamp body 7, and the lens is attached to the lamp body 7 with a bonding agent such as hot melt so that sealing is performed therebetween. Then, a screw (not shown) is inserted from the rear of the seal groove 8 in each of the boss portions 6 and screwed in so as to ensure the strength of attachment of the lens. Reference numerals 9 and 7a indicate an electric bulb and a shade, respectively.

Figure 3:
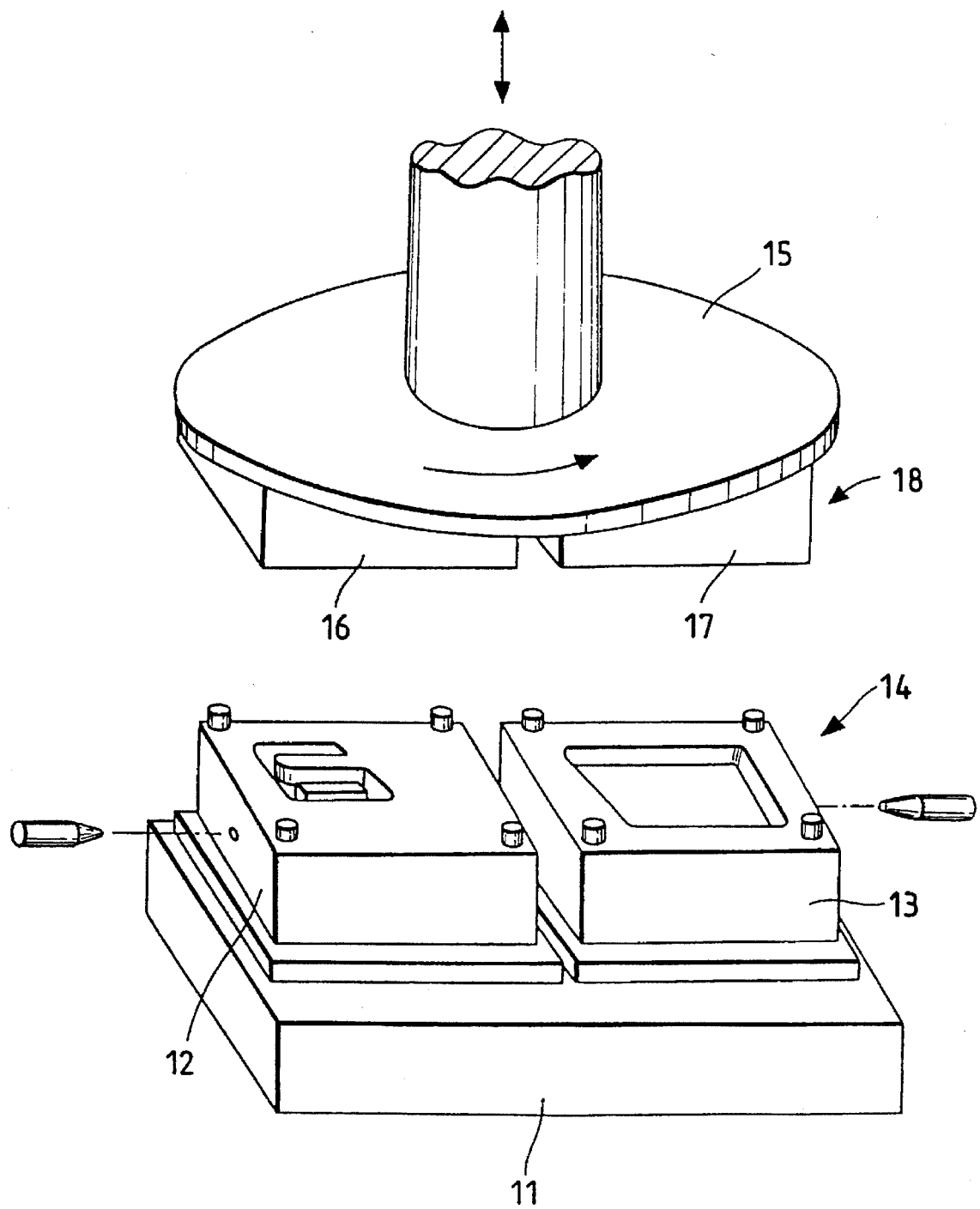
FIG. 3 is a conceptual view describing two-color molding.

In the above-mentioned two-color molding, as shown in FIG. 3 which is a conceptual diagram thereof, there is provided a two-color molding apparatus constituted by a fixed portion 14 in which a preforming mold 12 and a postforming mold 13 are provided in parallel on a fixed table 11, and a movable portion 18 in which movable molds 16 and 17 are mounted on a rotary table 15, which is rotatable by a shaft. The movable portion 18 moves the rotary table 15 up and down while rotating the latter, so that the movable molds 16 and 17 can be disposed oppositely to the respective molds 12 and 13 of the fixed portion 14 alternately. Molding with the first color resin is performed with the preforming mold 12 and the movable mold 16. The product produced by molding with the first color resin is moved to the postforming mold 13 together with the movable mold 16, and then molding with the second color resin is performed using the postforming mold 13 and the movable mold 16. Accordingly, a resin-molded product in which the first and second color resins are integrated is obtained.

Figure 4A:
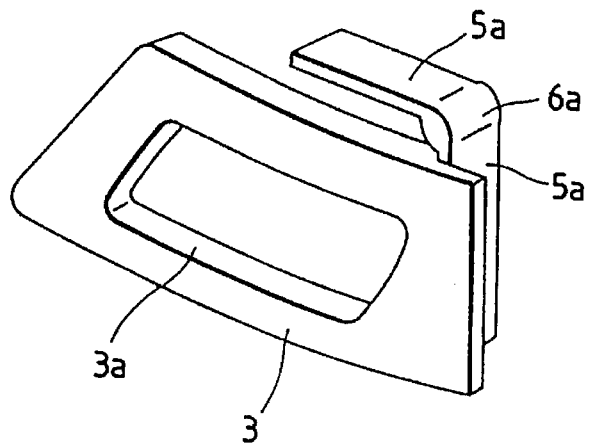
FIGS. 4(a) and 4(b) are perspective views of respective divided portions in which the lens in FIG. 1 is divided into resin colors for convenience.
Figure 4B:
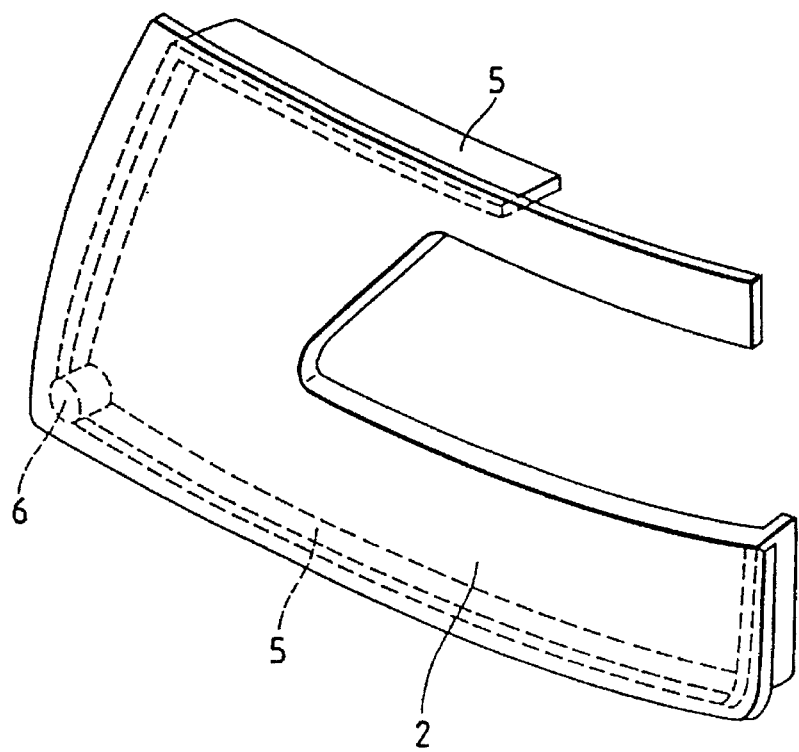

FIGS. 4(a) and 4(b) are exploded diagrams illustrating the tail lens surface portion 2 and the turn signal lens surface portion 3 being formed as different color portions. In this lens, the turn lens surface portion 3 is molded with amber resin by means of the preforming mold 12 in advance as shown in FIG. 4(a), and then the tail lens surface portion 2 is molded with red resin in the postforming mold 13 integrally with the turn signal lens surface portion 2. At this time, rib portions 3a are integrally formed on the outer circumference of the original lens surface portion 3 in the turn signal lens surface portion 3 and on the inner circumference of the opening portion of the lens surface portion 3 by means of the preforming mold 12. At the same time, a part 5a of the seal leg portion 5 in the circumferential portion of the tail lens surface portion 2 and a part of the boss portions 6a are formed integrally.

By integrally molding the tail lens surface portion 2 in the postforming mold 13 by use of this turn signal lens surface portion 3, the original lens surface portion 2, the seal leg portion 5 and the boss portions 6 are formed into the tail lens surface portion 2, while part of the tail lens surface portion 2 is constituted by the seal leg portion 5a and the boss portions 6a integrated with the turn signal lens surface portion 3 formed in the preforming mold 12. FIG. 4(b) is a diagram illustrating only the tail lens surface portion 3, the seal leg portion 5 and the boss portion 6 formed in the postforming mold 13.

Accordingly, in such a lens formed by two-color molding, while the tail lens surface portion 2 is formed in such a state that the thickness of the circumferential portion having the seal leg portion 5 and the boss portions 6 is larger than that of other portions, particularly in the portion where the boss portions 6a are formed integrally with the turn signal lens surface portion 3 as shown in FIG. 5(b) illustrating an enlarged section structure taken on line A—A in FIG. 1, and are integrated thereafter with the tail lens surface portion 2, the volume of red resin for molding the tail lens surface portion 2 in the postforming mold is in fact so small that there is little influence of cooling and solidification after molding. It is therefore possible to prevent sink marks from being formed in the surface of the tail lens surface portion 2.

In this embodiment, the seal leg portion 5 and boss portions other than the above-mentioned seal leg portion 5a and boss portions 6a, are not molded integrally with the turn signal lens surface portion 3. This is because, in order to integrally form all the circumferential seal leg portion 5 and boss portions 6 together with the turn signal lens surface portion 3, it is necessary to provide thin groove portions in the mold corresponding to the seal leg portion and boss portions, and it is difficult to inject resin into thin groove portions in the mold effectively. In addition, in this embodiment, the shape of the surface near the boss portion at the lower side has a bent shape in accordance with the shape of the surface of the lens surface portion, so that even if a sink mark is generated in the surface of the lens surface portion in this boss portion, it is inconspicuous.

Therefore, in order to surely prevent sink marks from being formed around the lens surface portion, for example, a plurality of resin injection ports are arranged along the thin groove portions in the mold for molding the seal leg portion and boss portions. In this case, it is possible to improve the efficiency of resin injection into the thin groove portions in the mold, and it is possible to form all the seal leg portion and boss portions integrally with the turn lens surface portion, so that it is possible to prevent sink marks from being formed in any portion around the tail lamp lens surface portion.

Although the lens of the above-described embodiment is formed by two-color molding, the present invention can be applied to a case of a single-color resin-molded product in the same manner. For example, in the case of the above embodiment, the turn signal lens surface portion and the tail lamp lens surface portion can be formed using a two-color molding process actually using the same color resin. That is, molding is performed in two steps but with the same color resin. The seal leg portion, boss portions, etc., other than a lens surface portion, are molded in advance, and the lens surface portion is overlaid and molded integrally in a post resin molding process. Accordingly, molding thick portions of the lens surface portion is avoided during post resin molding, so that it is possible to prevent sink marks from being formed in the surface of the lens surface portion.

As described above, according to the present invention, a thick portion formed integrally with at least a part of the thin lens surface portion is molded with resin in advance, and thereafter a thin lens surface portion is molded with resin integrally with the thick portion, as a result of which the influence of cooling of resin when the lens surface portion is molded in this portion is reduced. Accordingly, sink marks are prevented from being formed in the lens surface portion.

What is claimed is:

1. A resin-molded lens for an automotive lamp, said lens having a light transmitting surface formed with a cut out area, said cut out area defining a wide lens surface part and a narrow lens surface part, said wide lens surface part having a thin lens surface portion bounded on its outer periphery by a thick structural support portion, said support portion being formed integrally with at least part of said thin lens surface portion, the improvement wherein a thick structural portion for said narrow surface part is formed of a first resin material in a first resin injection step and said wide lens surface part, comprising said thin lens portion and said support portion at its outer periphery and said narrow surface part comprising only said thin lens surface portion without a support portion, is formed of a second resin material in a second resin injection step separate from said first resin injection step, said thin lens surface portion of said narrow surface part being disposed over and formed integral with said structural portion and being substantially free of sink marks.

2. The resin-molded lens for an automotive lamp lens of claim 1, wherein said thick structural portion comprises at least one of a seal leg portion, a rib portion, and a boss portion.

3. The resin-molded lens for an automotive lamp lens of claim 1, wherein said thin and thick portions are separately molded using two-color molding.

4. A method for resin-molding an automotive lamp lens having a light transmitting surface formed with a cut out area, said cut out area defining a wide lens surface part and a narrow lens surface part, said wide lens surface part having a thin lens surface portion bounded on its outer periphery by a thick structural support portion, said support portion being formed integrally with at least part of said thin lens surface, comprising the steps of:

molding said thick structural support portion for said narrow surface part with a first resin material in a first resin injection step, and molding said wide lens surface part, comprising said thin lens portion and said support portion at its outer periphery and said narrow surface part comprising only said thin lens surface portion without a support portion, with a second resin material in a second resin injection step, subsequent to said first resin injection step, whereby said thin lens surface portion is formed integrally with and on top of said thick structural portion.

5. The method for resin-molding an automotive lamp lens of claim 4, wherein said thick portion comprises at least one of a seal leg portion, a rib portion, and a boss portion.

6. The method for resin-molding an automotive lamp lens of claim 4, wherein said thin and thick portions are separately molded using two-color molding.

7. A method for resin-molding an automotive lamp lens having both a thin lens surface portion and a thick structural portion comprising the steps of:

molding said thick structural portion in a performing mold, moving said molded thick structural portion to a separate post forming mold; and molding said thin lens portion in a post forming mold to be over and integral with the thick structural portion.

8. The method of claim 7, wherein said thick structural portion is molded with a moveable mold.

9. The method of claim 8, wherein said moving step comprises moving said thick structural portion and said moveable mold.

10. The method of claim 7, wherein each of said molding steps are performed by injecting resin at a location proximate said thick portion.

* * * * *